(12) United States Patent
Farrington et al.

(10) Patent No.: US 6,188,592 B1
(45) Date of Patent: Feb. 13, 2001

(54) EXTERNALLY-DRIVEN SCHEME FOR SYNCHRONOUS RECTIFICATION

(75) Inventors: Richard W. Farrington, Heath; Claes Svardsjo, Richardson; William Hart, Plano, all of TX (US)

(73) Assignee: Ericsson Inc., Richardson, TX (US)

( * ) Notice: Under 35 U.S.C. 154(b), the term of this patent shall be extended for 0 days.

(21) Appl. No.: 09/434,777

(22) Filed: Nov. 5, 1999

(51) Int. Cl.[7] .............................. H02M 3/24; H02M 3/335
(52) U.S. Cl. ........................ 363/98; 363/21; 363/127
(58) Field of Search .................................. 363/98, 89, 81, 363/82, 83, 84, 16, 21, 127, 131; 323/282, 283

(56) References Cited

U.S. PATENT DOCUMENTS 5,818,704 * 10/1998 Martinez ................................. 363/21

* cited by examiner

Primary Examiner—Peter S. Wong
Assistant Examiner—Rajnikant B. Patel
(74) Attorney, Agent, or Firm—Arthur I. Navarro

(57) ABSTRACT

A self-driven synchronous rectifier circuit (50) for a DC—DC power converter. The circuit comprises a primary transformer (16), a first synchronous rectifier (SQ1) coupled to the primary transformer (16), a second synchronous rectifier (SQ2) coupled to the primary transformer (16), an external drive circuit (18). The circuit (50) also comprises a plurality of switches (SQ3, SQ4) controllably coupled to second synchronous rectifier (SQ2). The external drive circuit (18) provides turn-off signaling for both synchronous rectifiers (SQ1, SQ2) Turn-on signaling provided for first synchronous rectifier (SQ1) by the primary transformer (16) turn-on signaling for second synchronous rectifier (SQ2) is provided by the external drive circuit (18).

19 Claims, 7 Drawing Sheets

EXTERNALLY-DRIVEN SCHEME FOR SYNCHRONOUS RECTIFICATION

TECHNICAL FIELD

This invention relates generally to logic integrated circuits, and more particularly to a simplified externally-driven synchronous rectification scheme for a DC to DC power converter, easily adapted to all types of circuit topologies. More particularly, the present invention provides a scheme for synchronous rectification that simplifies the complexity of the timing circuitry.

BACKGROUND OF THE INVENTION

As logic integrated circuits (IC) have migrated to lower working voltages in the search for higher operating frequencies, and as overall system sizes have continued to decrease, power supply designs with smaller and higher efficiency power modules are in demand. In an effort to improve efficiencies and increase power densities, synchronous rectification has become necessary for these type of applications. Synchronous rectification has gained great popularity in the last ten years as low voltage semiconductor devices have advanced to make this a viable technology.

Synchronous rectification refers to using active devices such as the MOSFET as a replacement for diodes as rectifier elements in circuits. Recently, self-driven synchronous schemes have been widely adopted in the industry as the desired method for driving the synchronous rectifiers in DC/DC modules for output voltages of 5 volts and below.

Most of these self-driven schemes are designed to be used with a very particular set of topologies commonly known as "D, 1-D" (complementary driven) type topologies. See Cobos, J. A., et al., "Several alternatives for low output voltage on board converters", IEEE APEC 98 Proceedings, at pp. 163–169. See also U.S. Pat. No. 5,590,032 issued on Dec. 31, 1996 to Bowman et al. for a Self-synchronized Drive Circuit for a Synchronous Rectifier in a Clamped-Mode Power Converter, and U.S. Pat. No. 5,274,543 issued on Dec. 28, 1993 to Loftus entitled Zero-voltage Switching Power Converter with Lossless Synchronous Rectifier Gate Drive. In these types of converters, the power transformer signal in the secondary winding has the correct shape and timing to directly drive the synchronous rectifiers with minimum modifications.

In topologies such as the hard-switched half-bridge (HB) and the full-bridge (FB) rectifiers, and the push-pull topologies and non "D, 1-D" type topologies (e.g. clamp forward with passive reset), the transformer voltage has a recognizable zero voltage interval, making it undesirable to implement self-driven synchronous rectification. As a result, it is necessary to use an external drive circuit with these circuit topologies. Using the transformer voltage to drive the synchronous rectifiers results in conduction of the parasitic anti-parallel diode of the MOSFETs used for the synchronous rectifiers for a significant portion of the freewheeling interval, negatively affecting the efficiency of the module, which is undesired. Some self-driven implementations for the resonant reset forward have been reported. See Murakami, N. et al., "A highly efficient, low-profile 300 W power pack for telecommunications systems", IEEE APEC 1994 Proceedings, at pp. 786–792 and Yamashita, N. et al., "A compact, highly efficient 50 W on board power supply module for telecommunications systems", IEEE APEC 1995 Proceedings, at pp. 297–302. In these implementations, the resonant reset interval has been adjusted to provide the correct gate-drive signal during the freewheeling interval. Therefore, the externally-driven implementation offers a better solution for synchronous rectification in many instances. However, the prior art externally-driven synchronous rectification is both complex and costly.

The implementation of an externally driven scheme for non "D, 1-D" type topologies, for example, requires a timing network that will allow the proper adjustment for the synchronous rectifier driving pulses relative to the primary drive, a signal transformer or opto-coupler to transfer the timing information between primary and secondary, an inverting stage, and a driving stage. The inverting stage is required to generate the proper driving pulses for the synchronous rectifier that handles the freewheeling current. The complexity and cost of such an external driving scheme has deterred the electronics industry from embracing the externally driven synchronous rectifier. Thus, what is needed is a simplified implementation of the externally driven synchronous rectifier.

SUMMARY OF THE INVENTION

The present invention achieves technical advantages as an externally driven synchronous rectification scheme that can be easily adapted to all types of topologies, but particularly adaptable to push-pull converters, two-switch forward, conventional forward converters ( hard-switched half-bridge (HB) and the full-bridge (FB) rectifiers), and non-"D, 1-D" type topologies (e.g. clamp forward with passive reset) for which no efficient externally-driven synchronous rectification scheme was previously available.

In one embodiment, disclosed is an externally-driven synchronous rectifier circuit for a DC to DC power converter. The circuit includes a primary transformer having a primary and secondary winding, the secondary winding having a first terminal and a second terminal. The circuit includes a first synchronous rectifier, having a gate, coupled to the second terminal of said primary transformer and having a control terminal, and a second synchronous rectifier coupled to the first terminal of said primary transformer and having a control terminal. An external drive circuit includes a timing transformer having a primary and secondary winding, the secondary winding having a first and second terminal. A first switch is controllably coupled to the second synchronous rectifier control terminal, and a second switch is also controllably coupled to the second synchronous rectifier control terminal. The circuit further comprises an inductor in series with the first terminal of the primary transformer and the output voltage terminal, as well as a capacitor coupled in parallel with the inductor. Because the first synchronous rectifier is not coupled to the timing transformer, only the second synchronous rectifier can receive timing information from the external drive circuit.

In another embodiment, disclosed is an externally-driven synchronous rectifier circuit for a DC to DC power converter. The circuit, similar to the embodiment described above, further comprises a third and fourth switch wherein the third switch is coupled to the second synchronous rectifier and the fourth switch coupled to the first synchronous rectifier. Each switch contains a gate, drain, and source. The secondary winding of the timing transformer comprises a center tap connected to the return voltage terminal. The gate of the first switch is connected to the first end of the secondary winding of the timing transformer while the gate of the second switch is connected to the first end of the primary transformer, therefore both switches can receive timing information from the external drive circuit and thus both synchronous rectifiers can receive timing information from the external drive circuit.

Other embodiments of the present invention include implementation as a full wave rectifier. Further embodiments include utilizing current limiting resistors for limiting the drive current of the circuit, additional switches for limiting the gate voltage, and additional capacitors for minimizing voltage overshoot across the synchronous rectifiers.

Also disclosed is a method of rectifying a varying DC signal of a DC—DC power converter using an externally driven synchronous rectifier circuit with a transformer having a primary winding and a secondary winding, where the secondary winding has a first and second terminal. The method includes the steps of providing the varying DC signal to the primary winding of the transformer, a first synchronous rectifier controllably conducting current via a second terminal of the second winding and a first switch controlling the first synchronous rectifier. A second synchronous rectifier controllably conducts current via the first terminal of the second winding, and a first switch controls the second synchronous rectifier, wherein the first and second synchronous rectifiers conduct when a voltage across the secondary winding is approximately zero.

BRIEF DESCRIPTION OF THE DRAWINGS

The above features of the present invention will be more clearly understood from consideration of the following descriptions in connection with accompanying drawings in which.

Corresponding numerals and symbols in the different figures refer to corresponding parts unless otherwise indicated.

DETAILED DESCRIPTION OF PREFERRED EMBODIMENTS

The following is a description of the structure and method of the present invention. A prior art circuit will be discussed first, followed by a description of several preferred embodiments and alternatives of the present invention, and a discussion of the advantages.

One problem with applying synchronous rectification schemes to a conventional forward topology is that the synchronous rectifier which conducts during the freewheeling stage turns off before the freewheeling stage ends. Furthermore, if a MOSFET is used for the synchronous rectifier, the parasitic anti-parallel diode of the MOSFET conducts, increasing the losses. It is necessary for the MOSFET to remain on and conduct during the entire freewheeling stage to effectively implement a synchronous rectification scheme for these types of converters, and to obtain high efficiency. The externally-driven circuitry allows for the proper driving pulse to be generated for a synchronous rectifier. The prior art has established a solution to the freewheeling current problem.

Figure 1A:
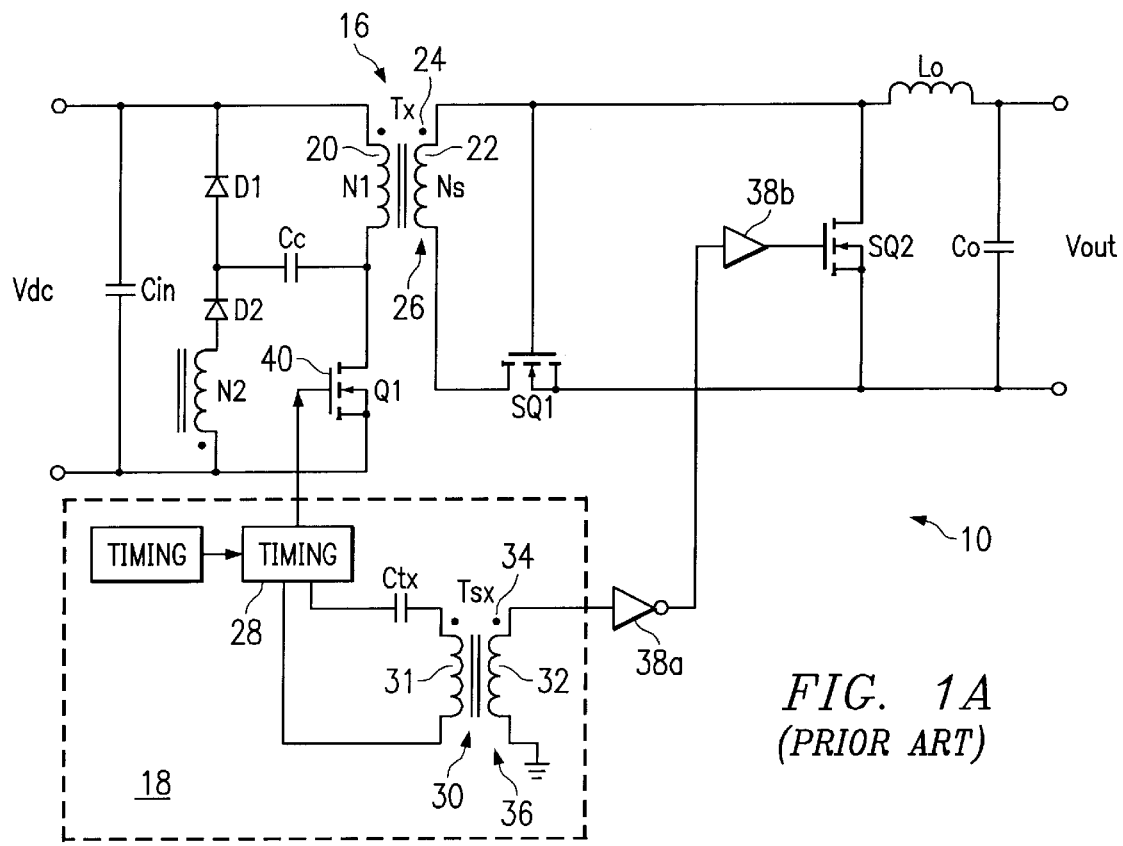
FIG. 1A illustrates a prior art conventional forward converter with externally-driven synchronous rectification in which one synchronous rectifier is driven.
Figure 1B:
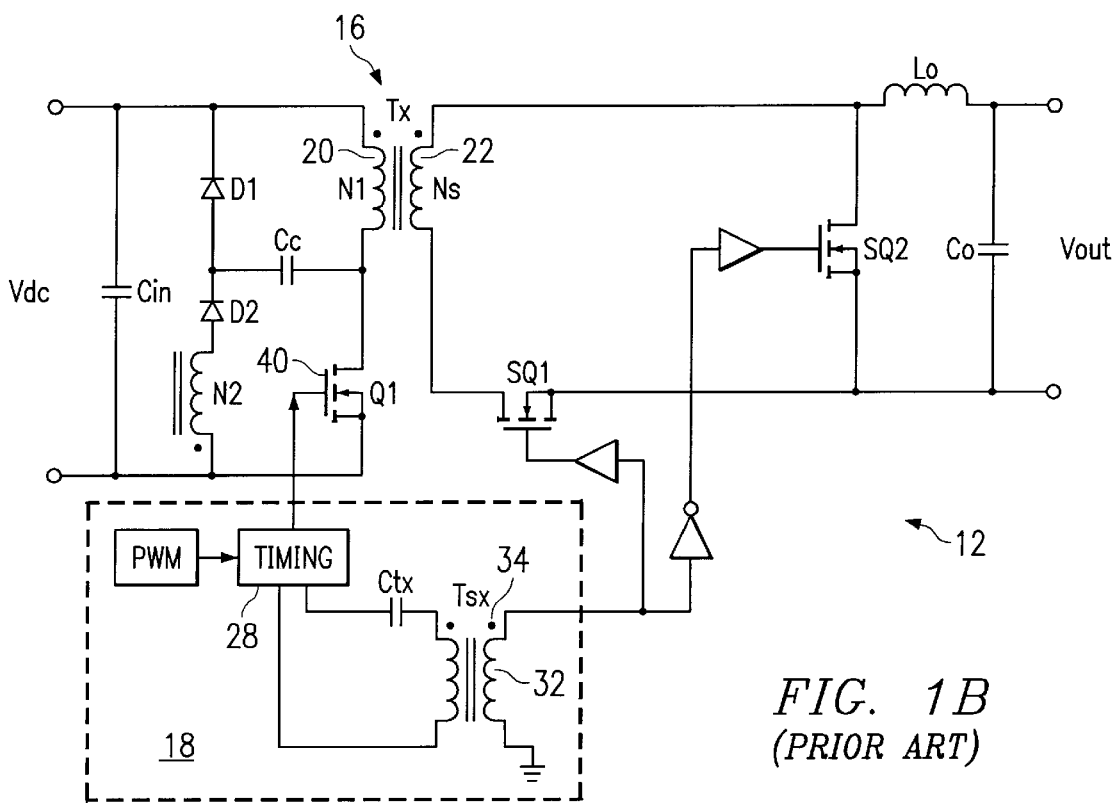
FIG. 1B illustrates a prior art conventional forward converter with externally-driven synchronous rectification in which both synchronous rectifiers are driven.
Figure 1C:
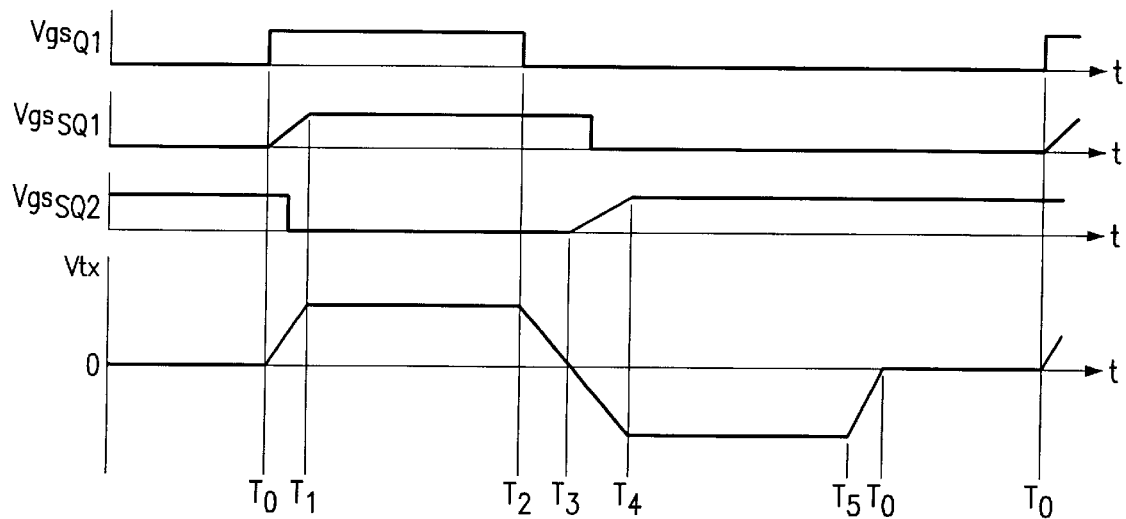
FIG. 1C shows voltage waveforms of the self-driven synchronous rectifier of the prior art for a conventional forward converter circuit with externally driven synchronous rectification.

Referring to FIGS. 1A and 1B, therein is illustrated an externally-driven synchronous rectification circuit 10 of the prior art used in a conventional forward topology with a corresponding timing diagram of the voltage waveforms shown in FIG. 1C. The timing signals for first synchronous rectifier SQ1 is derived from the primary transformer 16 while second synchronous rectifier SQ2 derives its timing signals from the external drive circuit 18. The primary transformer 16 has a primary and secondary winding, 20 and 22, respectively.

As such, some of the timing information for the externally-driven synchronous rectification circuit 10 is obtained by transferring the information from the primary winding 20 to the secondary winding 22. The secondary winding 22 has a first terminal 24 and a second terminal 26. The timing information is transferred to first synchronous rectifier SQ1 by coupling the gate of first synchronous rectifier SQ1 to the second terminal 26. Likewise, second synchronous rectifier SQ2 receives its timing information from the external drive circuit 18 which includes timing circuitry 28 and a timing transformer 30. The second transformer 30 has a primary winding 31 and a secondary winding 32 the second winding 32 having a first terminal 34 and a second terminal 36. The primary winding 31 receives the timing information and transfers that information to the secondary winding 32. The first terminal 34 of the timing transformer 30 is connected to the gate of second synchronous rectifier SQ2. As shown in FIG. 1A, gates 38a and 38b may be used to drive the gate of second synchronous rectifier SQ2.

A second embodiment of a prior art synchronous rectifier circuit 12 is shown in FIG. 1B which utilizes the external drive circuit 18 to provide timing information to both synchronous rectifiers SQ1 and SQ2. The second synchronous rectifier circuit 12 is similar to the synchronous rectification circuit 10 described above with the exception that the gate of first synchronous rectifier SQ1 is connected to the first terminal 34 of the second winding 32, just as second synchronous rectifier SQ2 is connected, to receive its timing information. FIG. 1C illustrates the gate-to-source voltage waveforms for first synchronous rectifier SQ1, second synchronous rectifier SQ2, and switch Q1 as a function of the voltage across the primary transformer 16.

While the prior art synchronous rectifier circuits 10 and 12 provide the necessary timing for the synchronous rectifiers SQ1 and SQ2 to ensure correct on and off switching, these implementations are both complex and expensive. Because of the complexity and cost, the prior art synchronous rectification circuits 10 and 12 have not been embraced by industry for numerous applications. The present invention provides a simplified implementation of the externally-driven synchronous rectifier circuit 10 where the circuit's complexity and cost have been reduced. Furthermore, the present invention provides other advantages including eliminating disabling of the synchronous rectifiers SQ1 and SQ2 when current tries to flow from output to input generally causing the destruction of the synchronous rectifier circuits 10 and 12.

Figure 2A:
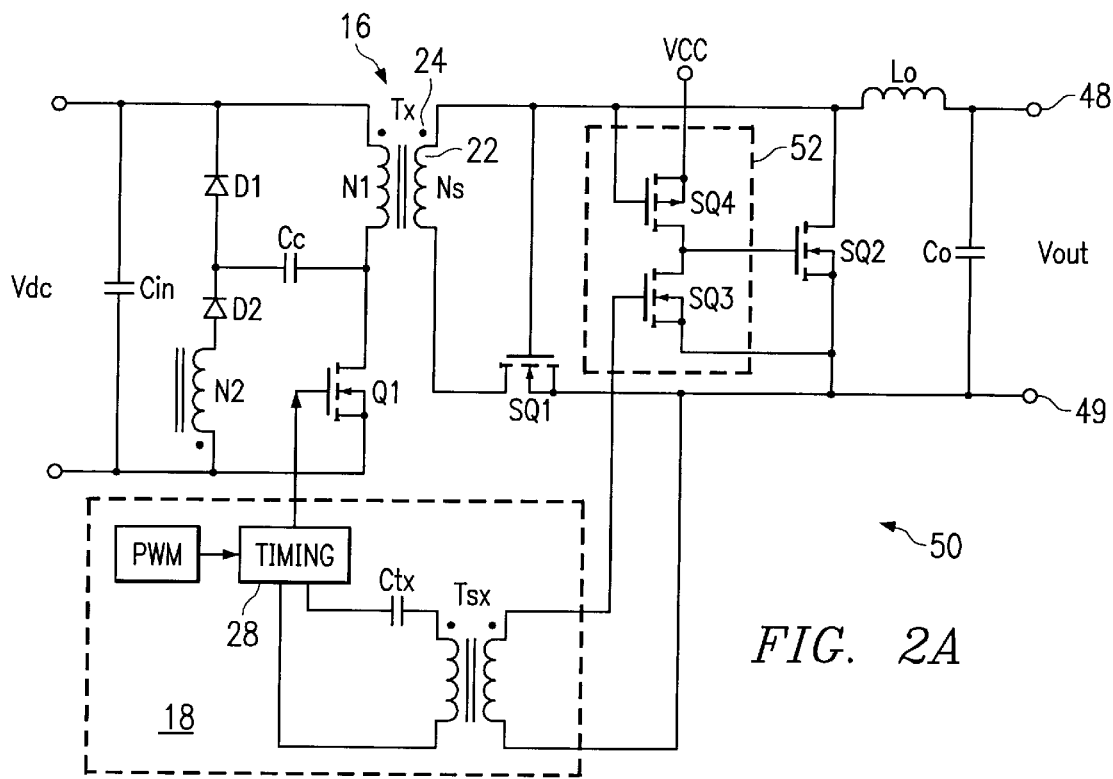
FIG. 2A illustrates a forward converter with externally-driven synchronous rectification in which one synchronous rectifier is driven utilizing an embodiment of the present invention.

The present invention provides a less complex and costly solution as compared to prior art synchronous rectifier circuits 10 and 12 by adding a first driving circuit 52 comprising two switches SQ3 and SQ4, as shown in the forward converter synchronous rectifier circuit with passive reset layout 50 of FIG. 2A. Preferably, switches SQ3 and SQ4 are MOSFETs smaller than the MOSFETs used as synchronous rectifiers SQ1 and SQ2. The switches SQ3 and SQ4 are used to drive synchronous rectifier SQ2. As shown in FIG. 2A, the inverting stage and first driving circuit 52 have been merged utilizing switches SQ2, SQ3 and SQ4.

According to the present invention, synchronous rectifiers SQ1 and SQ2 are turned off when the voltage of the primary transformer 16 switches polarity. Synchronous rectifier SQ2 is turned on through the anti-parallel diode D1. The timing circuit 18 is not used to turn-on the synchronous rectifiers SQ1 and SQ2 as the timing information is derived from the primary transformer 16. Synchronous rectifier SQ2 is coupled to the timing circuit 18 to provide the proper turn-off timing. Therefore, the timing circuit 18 can be much less complicated compared to those used with synchronous rectifier circuits 10 and 12. The inductor (Lo) is coupled in series between the first terminal 24 and the output voltage terminal 48 to smooth current ripples with the capacitor (Co) across the voltage terminal 48 to smooth the output voltage (Vo).

An additional advantage of the present externally-driven synchronous rectification circuit 50 is that the additional switches SQ3 and SQ4 act as an active damper to the gate drive signal used to drive the synchronous rectifier SQ2. The switches SQ3 and SQ4 provide a buffer to the gate signal of the synchronous rectifier SQ2 from the parasitic oscillations that normally appear in the secondary winding 22 of the primary transformer 16 due to the interactions of stray inductances and the output capacitance of the semiconductor devices.

Figure 2B:
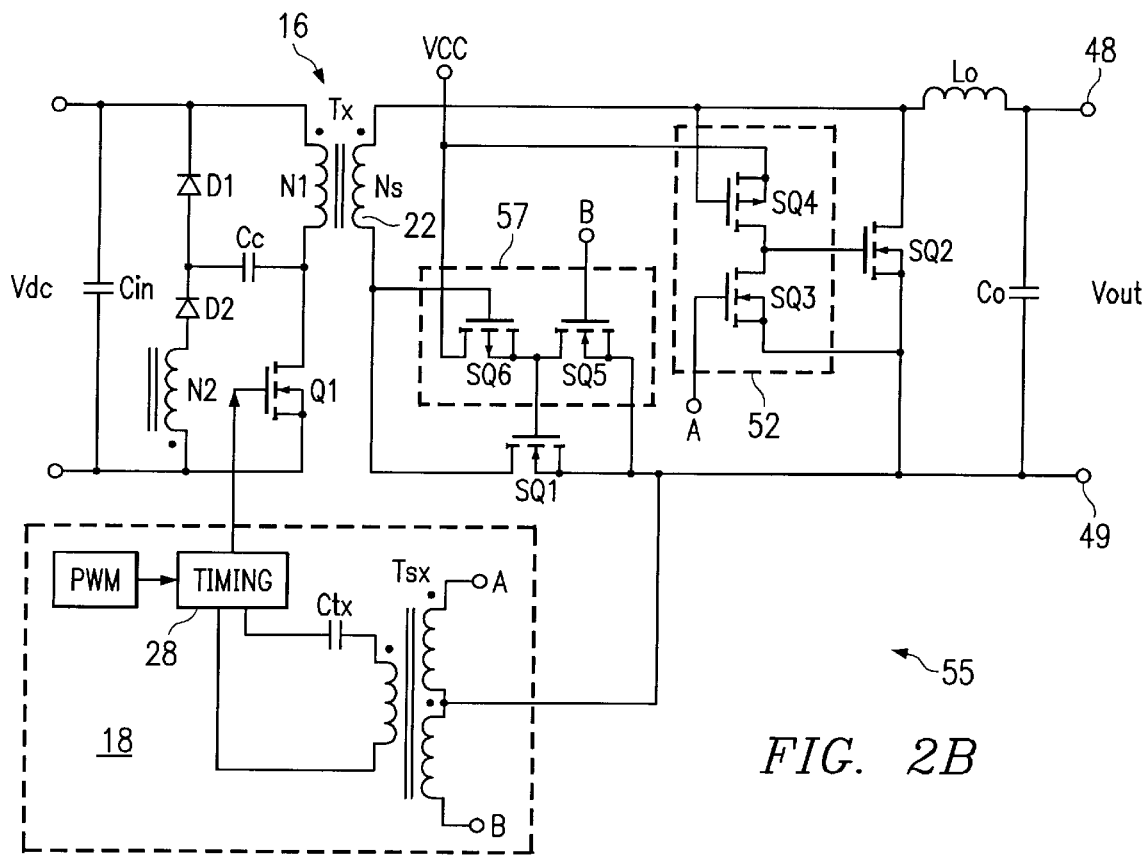
FIG. 2B illustrates a forward converter with externally-driven synchronous rectification in which both synchronous rectifiers are driven utilizing an embodiment of the present invention.

FIG. 2B illustrates another embodiment of a synchronous rectifier circuit 55, according to the present invention in which neither synchronous rectifiers SQ1 and SQ2 is self-driven. Again, the inverting and driving stages have been merged into first driving circut 52 and second driving circuit 57, as represented by switches SQ3, SQ4, SQ5 and SQ6. Specifically, switches SQ3 and SQ4 are used to provide the turn-off voltage from the external drive circuit 18 to the second synchronous rectifier SQ2 and switches SQ5 and SQ6 are used to provide the turn-off voltage from the external drive circuit 18 to the first synchronous rectifier SQ1. Some of the timing information from the primary transformer 16 is utilized to provide the turn-on voltage for the synchronous rectifiers SQ1 and SQ2. Since the external drive circuit 18 provides only the turn-off time of the rectifiers SQ1 and SQ2, the complexity of the timing circuitry 28 is significantly reduced.

Figure 3:
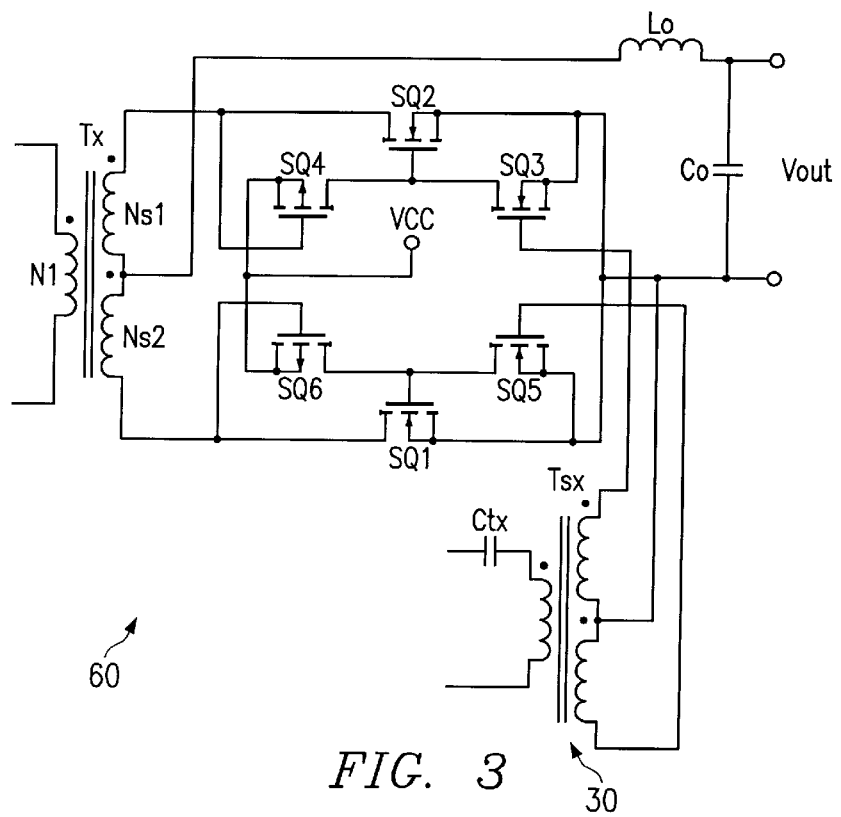
FIG. 3 illustrates a full wave rectifier with externally-driven synchronous rectification utilizing an embodiment of the present invention.

The implementation of the present invention for use with a full-wave rectifier is similar to that of the half-wave rectifier as shown and denoted generally as 60 in FIG. 3. However, the turn-off of the synchronous rectifiers SQ1 and SQ2 is determined from the signal from the timing transformer 30 of the external drive circuit (not shown in FIG. 3) and the turn-on timing is determined from the voltage generated from the primary transformer 16. If this driving scheme is implemented in topologies like the push-pull, half-bridge, or full-bridge topologies, an interesting phenomena is observed for conditions that traditionally result in reversal of power flow that eventually destroys the power module. The full-wave rectifier 60 of the present invention comprises a self-correcting mechanism that prevents the current from building in the opposite direction.

In the present invention, during conditions where there is a reversal of power flow, the current through the inductor (Lo) decreases and becomes negative, thus the current through the active switches SQ1, SQ2, SQ3, and SQ4 also changes polarity and flows through their anti-parallel diodes. Therefore, when the switches SQ1 and SQ3 attempt to turn off, nothing happens since current continues to flow in their anti-parallel diodes. Effectively, switches SQ1 and SQ3 will not turn off until their anti-parallel diode is naturally commutated off. The anti-parallel diodes will finally turn off when the summation of the reflected load current and the magnetizing current is equal to zero or slightly positive. Thus, the second synchronous rectifier SQ2 does not turn on until the voltage of the primary transformer 16 vanishes to zero so that no conflicting condition is developed. Generally this self-correcting mechanism works only for push-pull topologies because the turn off of the switches SQ1, SQ2, SQ3, and SQ4, like in most other topologies, does not determine the turn-off of the synchronous rectifiers SQ1 and SQ2.

Figure 4A:
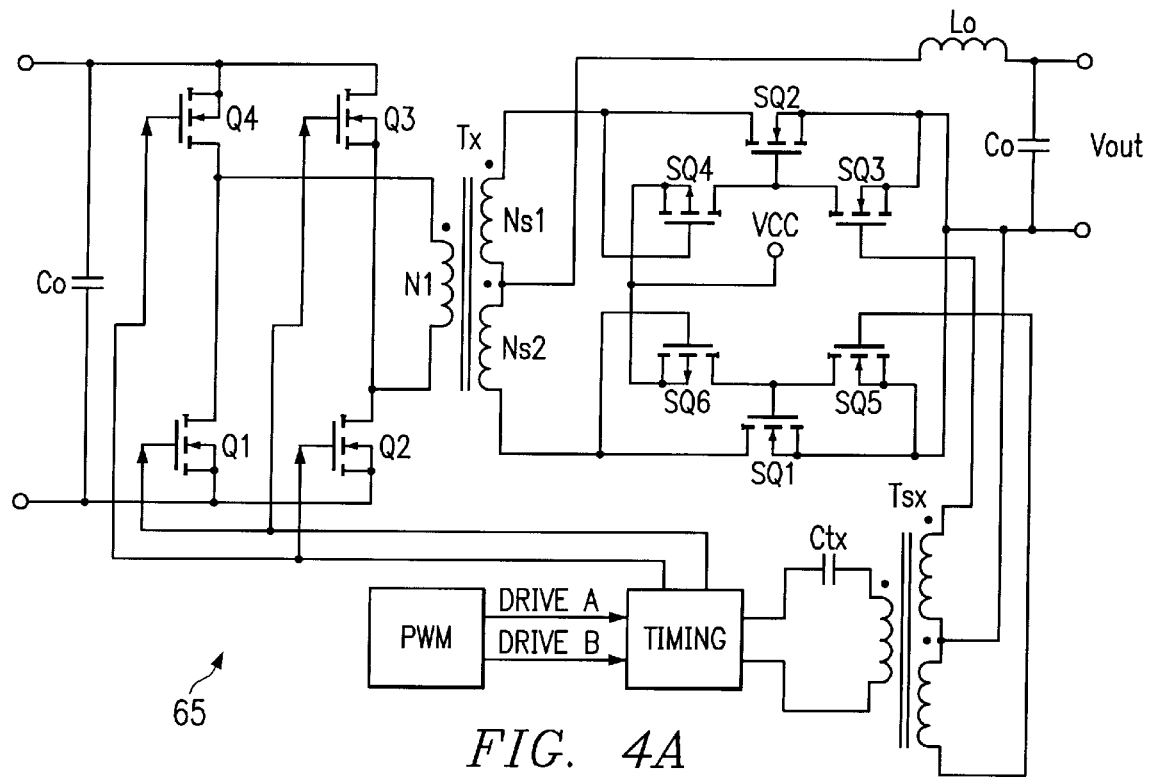
FIGS. 4A and 4B illustrate an implementation of an externally-driven synchronous rectifier for a full bridge topology utilizing an embodiment of the present invention.
Figure 4B:
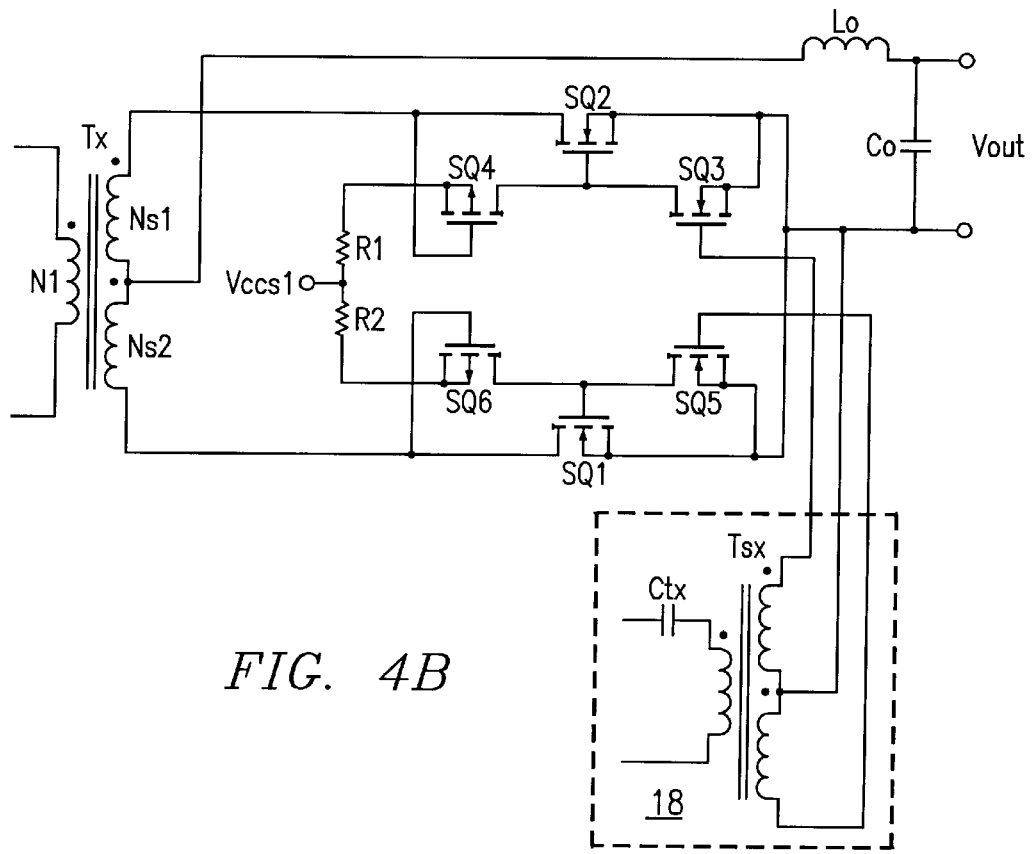
Figure 4C:
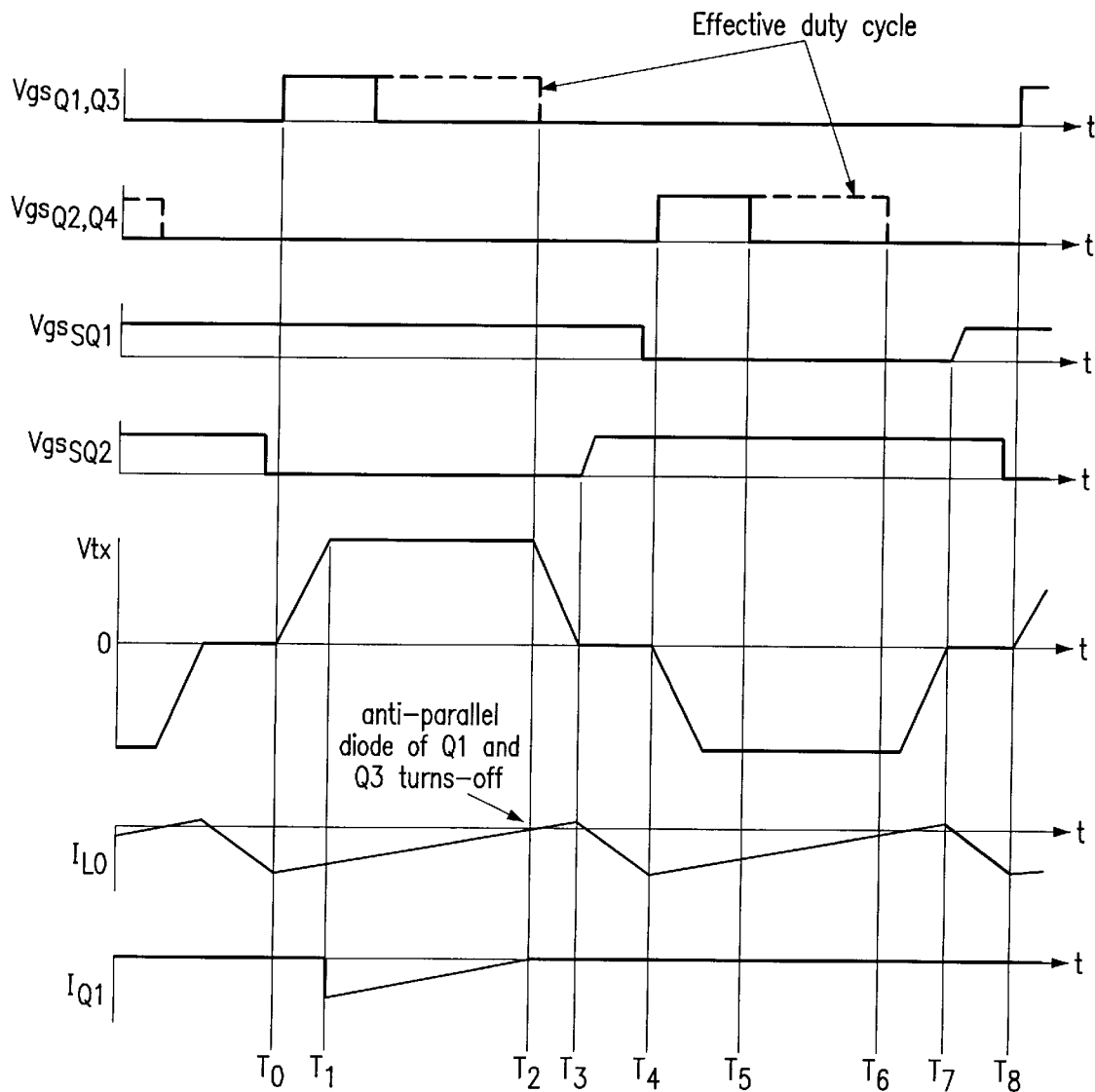
FIG. 4C shows voltage waveforms of the externally-driven synchronous rectifier for a full bridge topology during conditions where negative current flows through the output inductor.

FIGS. 4A and 4C illustrates the implementation of an externally-driven synchronous rectifier circuit for a full-bridge topology, denoted generally as 65, and the corresponding voltage waveforms for the conditions where there is a reversal of power flow in a full-bridge topology. These conditions may develop with two or more modules in parallel where a very loose current sharing scheme is used during the turn-on phase of a module while another module is already on (or module start-up into a working voltage, hot plug-in). For implementations where the external drive circuit 18 defines both the turn-on and turn-off times of the synchronous rectifiers SQ1 and SQ2, a typical synchronous rectifier would not be allowed to self-correct and both synchronous rectifiers SQ1 and SQ2 would conduct as soon as the switches turn off allowing the inductor current to build in the negative direction. Eventually, the inductor (Lo) current would grow in the negative direction to a magnitude such that the module would fail. Even if the module does not fail this is not a desirable mode of operation from a systems point of view.

For D and 1-D type topologies, this problem is more severe since a small negative current will result in "shoot-through" in the primary switches that can easily lead to a module failure. In general, an oring diode is needed when paralleling modules with synchronous rectification. More complex solutions would disable the synchronous rectifiers SQ1 and SQ2 when the inductor current goes negative. This suggests that an accurate means of measuring this current and a fast acting disabling circuit is needed.

Figure 5:
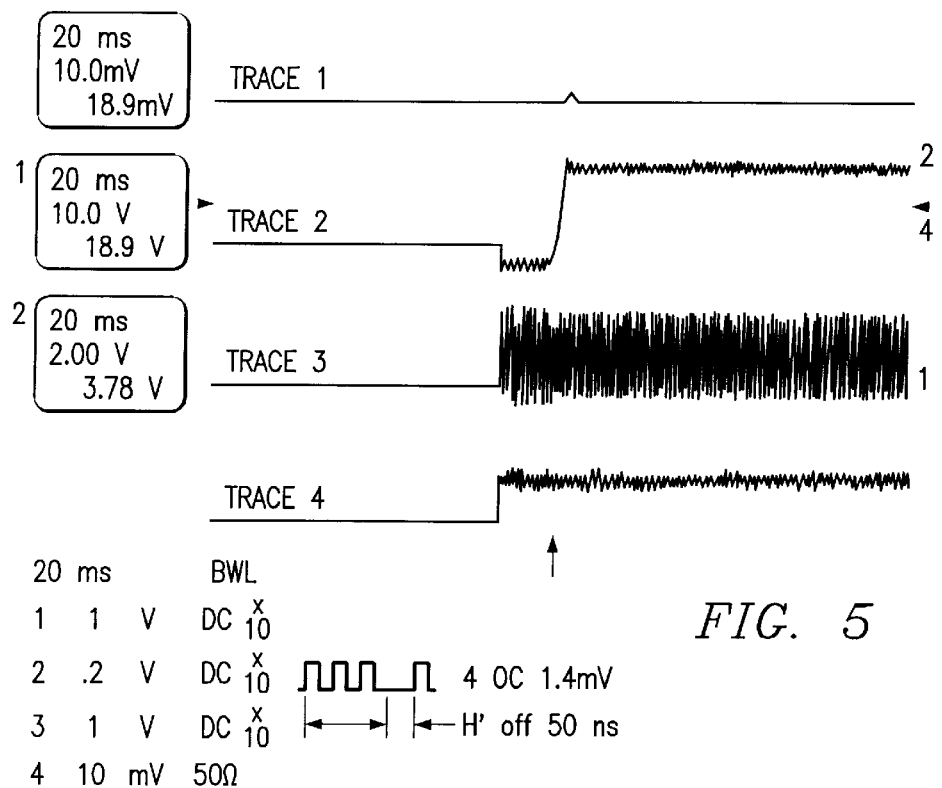
FIG. 5 shows experimental waveforms of a DC to DC converter using the full bridge implementation synchronous rectifier of the present invention.

FIG. 5 shows the waveforms of a DC to DC converter using the full-bridge synchronous rectifier circuit 65 of the present invention to drive a 3.3 V bus in the absence of an oring diode and active current sharing. Trace 1 shows the output voltage; trace 2 shows the output current; trace 3 shows the gate-drive of the synchronous rectifiers SQ1 and SQ2, and trace 4 shows the secondary bias voltage. It can be seen that the output current (trace 2) of the DC to DC module goes slightly negative initially before it builds up, thus confirming the expected self-correcting characteristics of the full-wave synchronous rectifier 65.

If shoot-through currents interfere with the normal operation of the full-bridge synchronous rectifier circuit 65, optional resistors R1 and R2 may be added, as shown in FIG. 4B. Again, the inverting and driving stages have been merged into one by using a p-FET in switches SQ4 and SQ6 and n-FET devices in switches SQ3 and SQ5. Due to the turn-on and turn-off characteristics of these devices, shoot-through currents will develop in the external driver circuit 18 during turn-on and turn-off. The addition of limiting resistors R1 and R2 in series with the p-FET devices, switches SQ4 and SQ6, will minimize the effects of shoot-through currents.

Figure 6:
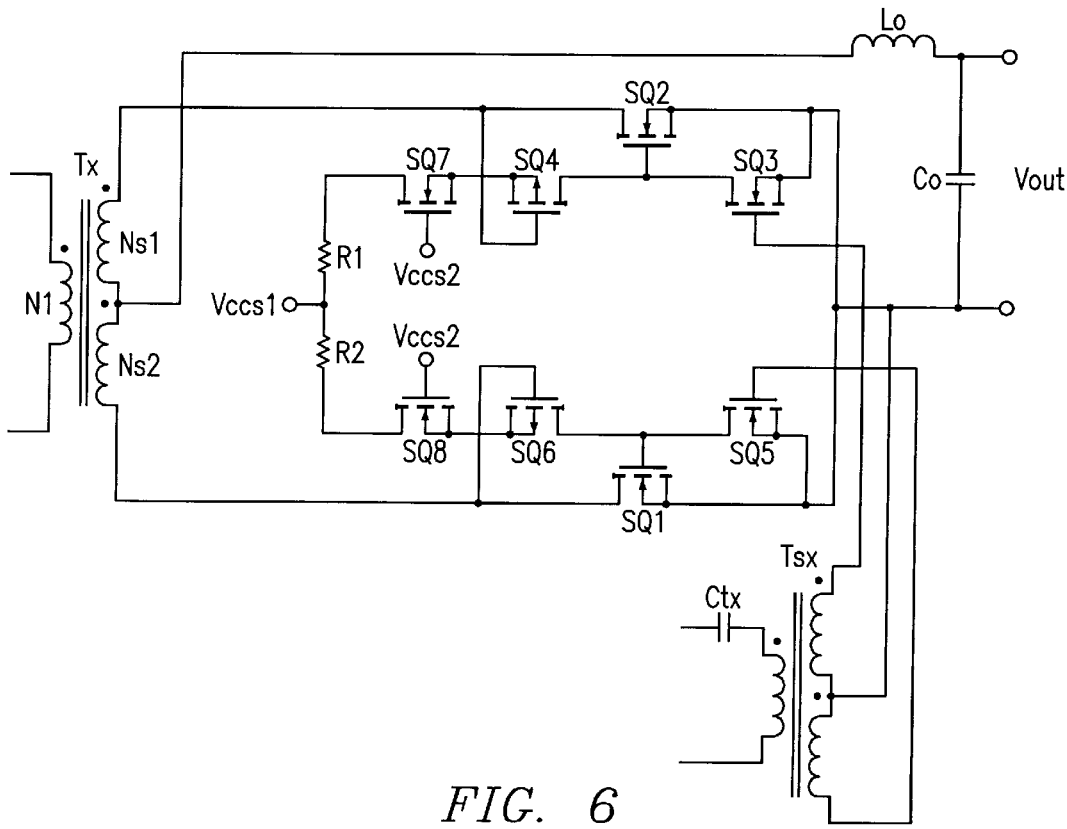
FIG. 6 shows embodiment of the present self-driven synchronous full-wave rectifier having gate voltage limiting MOSFETs.

In most practical applications, it is necessary to clamp the gate-drive signal to a predetermined value in order not to exceed the breakdown voltage of the gate. The voltage of synchronous rectifier circuits 10 and 12 is generated from the rectified peak transformer voltage resulting in a supply voltage that is susceptible to input voltage variations. An embodiment of the present invention which limits the gate voltage to a predetermined value is shown in FIG. 6. In this implementation, a pair of voltage limiting switches SQ7 and SQ8, preferably comprising N-type MOSFETs have been added to limit the voltage on the gate of the synchronous rectifiers SQ1 and SQ2 to VCCS2-gate minus the threshold voltage (1 to 2 volts).

Figure 7A:
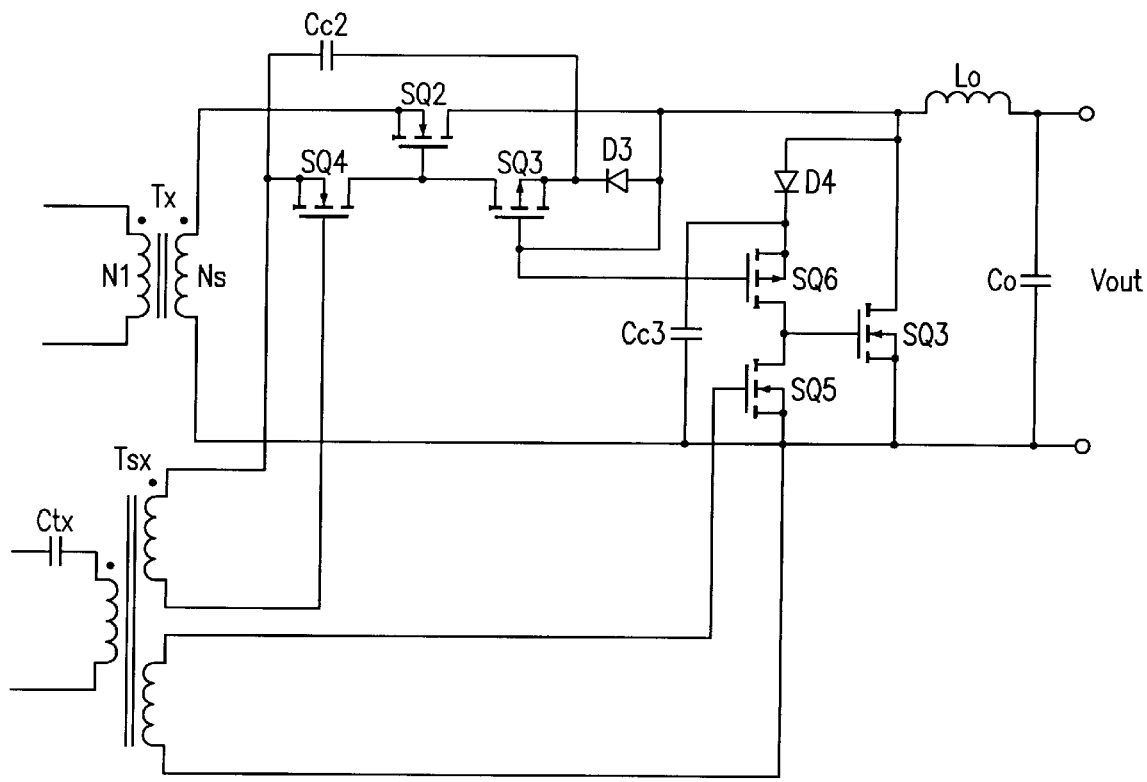
FIGS. 7A and 7B show another embodiment of the present invention with capacitors to reduce voltage overshoot across the synchronous rectifiers.
Figure 7B:
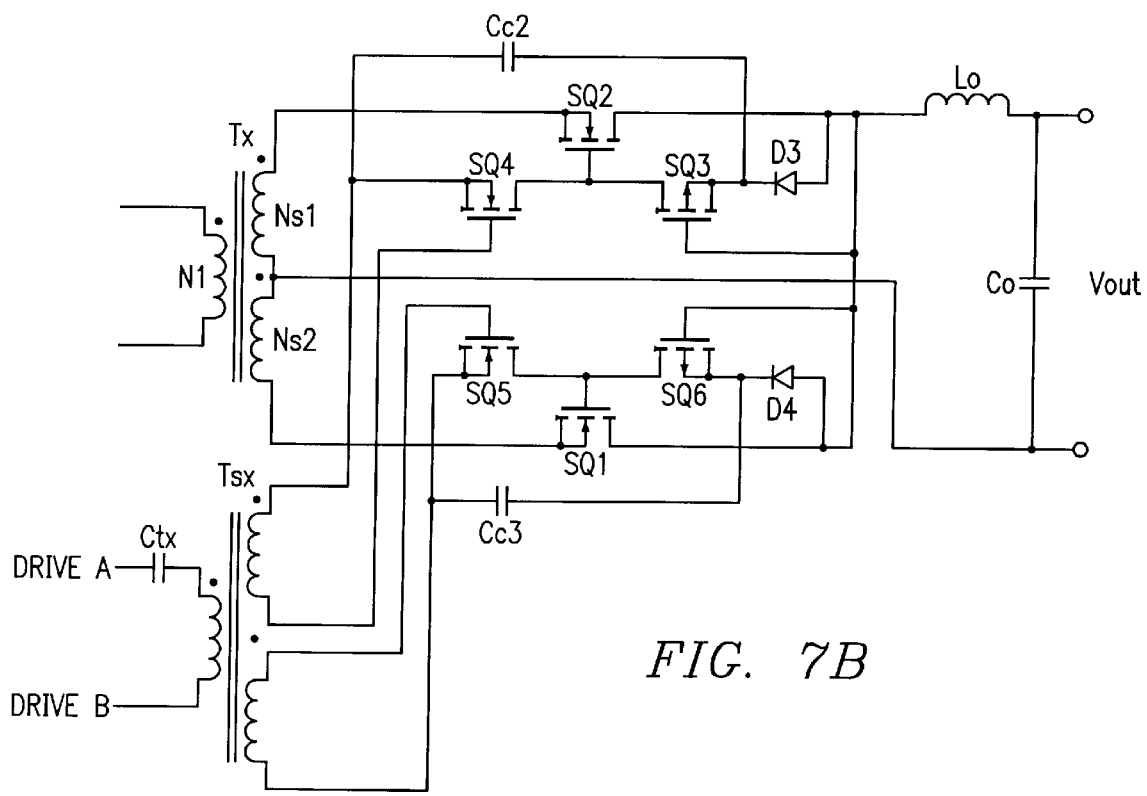

Implementing this driving scheme for the conventional half-wave and full-wave rectifier configurations may result in a float gate voltage for the synchronous rectifiers SQ1 and SQ2. Therefore, level shifting into the gate signal of the drive switches is needed. Level shifting of the drive voltage into the drive switches is shown in FIGS. 7A and 7B. Capacitors CC2 and CC3 provide a snubbing mechanism to minimize voltage overshoot across the synchronous rectifiers SQ1 and SQ2 and a bias voltage for the timing circuitry 28 of synchronous rectifiers SQ1 and SQ2.

The novel method and system of the present externally-driven synchronous rectifier schemes provide the advantage of efficiently providing externally-driven synchronous rectification for a DC—DC power converter, where the synchronous rectifier conducts when a voltage across the transformer secondary winding is approximately zero. A further advantage of the present invention is the ability to adapt the scheme for a variety of converter topologies. Another advantage of the present invention is that the switches SQ3 and SQ4 act as an active damper to the gate drive signal, providing a buffer to the gate signal of the synchronous rectifiers from parasitic oscillation, eliminating the need for additional components for minimizing this effect.

While the invention has been described with reference to illustrative embodiments, this description is not intended to be construed in a limiting sense. Various modifications in combinations of the illustrative embodiments, as well as other embodiments of the invention, will be apparent to persons skilled in the art upon reference to the description. For example, the synchronous rectifiers SQ1 and SQ2; switches SQ3, SQ4, SQ5, and SQ6; and voltage drivers SQ7 and SQ8 are shown as MOSFETs; however, it is contemplated that another type of FET or switching device would be suitable for use in the present invention. It is therefore intended that the appended claims encompass any such modifications or embodiments.

What is claimed is:

1. An externally-driven synchronous rectifier circuit for a DC to DC power converter comprising:
   a primary transformer having a primary and secondary winding, said secondary winding having a first terminal and a second terminal;
   a first synchronous rectifier operably coupled to said second terminal of said primary transformer;
   a second synchronous rectifier operably coupled to said first terminal of said primary transformer;
   an external drive circuit operably coupled to said primary winding of said primary transformer, said external drive circuit further comprising a timing circuit and a timing transformer, said timing transformer having a first end and a second end;
   a first driving circuit operably coupled to said second synchronous rectifier, said first driving circuit further comprising a first switch and a second switch comprising MOSFETs having gates, wherein said gate of said first switch is connected to said first end of said timing transformer, and wherein said gate of said second switch is connected to said first end of said primary transformer; and
   a second driving circuit operably coupled to said first synchronous rectifier, said second driving circuit further comprising a third switch and a fourth switch comprising MOSFETS having gates, wherein said gate of said third switch is connect to said second end of said timing transformer, and wherein said gate of said fourth switch is connected to said second end of said primary transformer.

2. The externally-driven synchronous rectifier circuit according to claim 1 further comprising:
   an output voltage terminal and a return voltage terminal;
   a first inductor coupled in series with said first terminal of said secondary winding of said primary transformer and said output voltage terminal; and
   a capacitor coupled in parallel with said output voltage terminal and said return voltage terminal.

3. The externally-driven synchronous rectifier circuit according to claim 1 wherein said external drive circuit further includes utilizing weight modulation.

4. The externally-driven synchronous rectifier circuit according to claim 1 wherein said secondary winding of said primary transformer further comprises a center tap.

5. The externally-driven synchronous rectifier circuit according to claim 1 wherein said externally-driven synchronous rectifier circuit is adaptable to a full-bridge topology.

6. The externally-driven synchronous rectifier circuit according to claim 1 further comprising a first resistor and a second resistor, said first resistor coupled in series with said second switch and said second resistor coupled in series with said fourth switch, whereby said first and second resistors limit the drive current of said externally-driven synchronous rectifier circuit.

7. The externally-driven synchronous rectifier circuit according to claim 6 further comprising:
   a fifth switch coupled in series between said second switch and said first resistor; and a sixth switch coupled in series between said fourth switch and said second resistor;

whereby said fifth and sixth switches limit the gate voltage of said first and second synchronous rectifiers, respectively.

8. The externally-driven synchronous rectifier circuit according to claim 7 wherein said fifth and sixth switches are MOSFETs having gates connected to a voltage source.

9. The externally-driven synchronous rectifier circuit according to claim 1 further comprising:

a first diode having an input and an output end;

a second diode having an input and an output end;

a first capacitor having a first and second terminal; and a second capacitor having a first and second terminal;

whereby said externally-driven synchronous rectifier circuit is adapted for conventional half-wave and full-wave rectifier configurations.

10. The externally-driven synchronous rectifier circuit of claim 1 wherein said second driving circuit is adapted to provide a turn-on signal for said first synchronous rectifier.

11. The externally-driven synchronous rectifier circuit according to claim 1 wherein said first driving circuit is adapted to provide a turn-on signal for said second synchronous rectifier.

12. The externally-driven synchronous rectifier circuit according to claim 1 wherein said external drive circuit is adapted to provide a turn-off signal for said first and second synchronous rectifiers.

13. The externally-driven synchronous rectifier circuit according to claim 1 wherein said first and second switches are utilized to provide a simplified rectification scheme by merging said first driving circuit with said inverting first synchronous rectifier.

14. The externally-driven synchronous rectifier circuit according to claim 1 wherein said timing transformer further comprises a primary and secondary winding, said secondary winding having a first terminal and a second terminal.

15. The externally-driven synchronous rectifier circuit according to claim 1 wherein said first terminal of said first transformer is a first end of said secondary winding of said first transformer;

said second terminal of said primary transformer is a second end of said secondary winding of said primary transformer;

said first terminal of said second transformer is a first end of said secondary winding of said timing transformer;

said second terminal of said primary transformer is a second end of said secondary winding of said timing transformer; and said first and second synchronous rectifiers comprise MOSFETs.

16. The externally-driven synchronous rectifier circuit according to claim 14 wherein said third and fourth switches comprise MOSFETs having gates, wherein said gate of said third switch is connected to said second end of said timing transformer, and wherein said gate of said fourth switch is connected to said second end of said primary transformer.

17. The externally-driven synchronous rectifier circuit according to claim 14 wherein said secondary winding of said timing transformer comprises a center tap connected to a return voltage terminal.

18. The externally-driven synchronous rectifier circuit according to claim 14 wherein said external drive circuit further comprises a capacitor coupled in series with said primary winding of said timing transformer and with said timing circuit.

19. The externally-driven synchronous rectifier circuit according to claim 14 wherein said secondary winding of said timing transformer comprises a first and a second sub-winding, said first sub-winding having a first terminal and a second terminal, and said second sub-winding having a first terminal and a second terminal.

* * * * *